US012389182B2

(12) United States Patent
Enomoto et al.

(10) Patent No.: US 12,389,182 B2
(45) Date of Patent: Aug. 12, 2025

(54) INFORMATION PROCESSING METHOD, RECORDING MEDIUM, AND INFORMATION PROCESSING SYSTEM

(71) Applicant: Panasonic Intellectual Property Corporation of America, Torrance, CA (US)

(72) Inventors: Seigo Enomoto, Kyoto (JP); Ko Mizuno, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 19 days.

(21) Appl. No.: 18/376,619

(22) Filed: Oct. 4, 2023

(65) Prior Publication Data

US 2024/0031757 A1 Jan. 25, 2024

Related U.S. Application Data

(63) Continuation of application No. PCT/JP2022/017168, filed on Apr. 6, 2022.

(60) Provisional application No. 63/173,643, filed on Apr. 12, 2021.

(30) Foreign Application Priority Data

Mar. 16, 2022 (JP) ................................ 2022-041098

(51) Int. Cl.
*H04R 5/00* (2006.01)
*H04S 7/00* (2006.01)
*H04R 5/02* (2006.01)

(52) U.S. Cl.
CPC .................................... *H04S 7/00* (2013.01)

(58) Field of Classification Search
CPC ........................................................ H04S 7/00
USPC .................................................... 381/1, 310
See application file for complete search history.

(56) References Cited

U.S. PATENT DOCUMENTS 10,674,307 B1 6/2020 Robinson et al.
2019/0180731 A1* 6/2019 Leppanen .............. H04S 7/306
2019/0215637 A1 7/2019 Lee et al.

FOREIGN PATENT DOCUMENTS

JP 2019-146160 8/2019
WO 2020/197839 10/2020
WO WO-2020197839 A1 * 10/2020 ............ H04R 5/033

OTHER PUBLICATIONS

International Search Report (ISR) issued on Jul. 5, 2022 in International (PCT) Application No. PCT/JP2022/017168.

* cited by examiner

*Primary Examiner* — Ammar T Hamid
(74) *Attorney, Agent, or Firm* — Wenderoth, Lind & Ponack, L.L.P.

(57) ABSTRACT

An information processing method includes: obtaining spatial information indicating a shape of a virtual space including an obstacle and a sound source object that emits a predetermined sound; obtaining position information indicating a position and an orientation of a user in the virtual space; and generating an acoustic virtual environment by determining, based on the position and the orientation of the user and a position of the obstacle in the virtual space, a position of a virtual reflection surface off which the predetermined sound is reflected in the virtual space.

11 Claims, 9 Drawing Sheets

INFORMATION PROCESSING METHOD, RECORDING MEDIUM, AND INFORMATION PROCESSING SYSTEM

CROSS REFERENCE TO RELATED APPLICATIONS

This is a continuation application of PCT International Application No. PCT/JP2022/017168 filed on Apr. 6, 2022, designating the United States of America, which is based on and claims priorities of Japanese Patent Application No. 2022-041098 filed on Mar. 16, 2022 and of U.S. Patent Application No. 63/173,643 filed on Apr. 12, 2021. The entire disclosures of the above-identified applications, including the specifications, drawings and claims are incorporated herein by reference in their entirety.

FIELD

The present disclosure relates to an information processing method, a recording medium, and an information processing system for generating an acoustic virtual environment.

BACKGROUND

PTL 1 discloses a method and a system for render sounds and voices on a headphone in a manner that is capable of head tracking.

CITATION LIST

Patent Literature

PTL 1: Japanese Unexamined Patent Application Publication No. 2019-146160

SUMMARY

Technical Problem

An object of the present disclosure is to provide an information processing method and the like capable of reducing processing time required to reproduce a stereophonic sound to be perceived by a user.

Solution to Problem

In accordance with an aspect of the present disclosure, an information processing method includes: obtaining spatial information indicating a shape of a virtual space including an obstacle and a sound source object that emits a predetermined sound; obtaining position information indicating a position and an orientation of a user in the virtual space; and generating an acoustic virtual environment by determining, based on the position and the orientation of the user and a position of the obstacle in the virtual space, a position of a virtual reflection surface off which the predetermined sound is reflected in the virtual space.

In accordance with another aspect of the present disclosure, a non-transitory computer-readable recording medium having recorded thereon a program for causing a computer to perform the above-described information processing method.

In accordance with still another aspect of the present disclosure, an information processing system includes: a spatial information obtainer that obtains spatial information indicating a shape of a virtual space including an obstacle and a sound source object that emits a predetermined sound; a position information obtainer that obtains position information indicating a position and an orientation of a user in the virtual space; and a space generator that generates an acoustic virtual environment by determining, based on the position and the orientation of the user and a position of the obstacle in the virtual space, a position of a virtual reflection surface off which the predetermined sound is reflected in the virtual space.

General or specific aspects of the present disclosure may be implemented to a system, a device, a method, an integrated circuit, a computer program, a non-transitory computer-readable recording medium such as a Compact Disc-Read Only Memory (CD-ROM), or any given combination thereof.

Advantageous Effects

The present disclosure produces an effect that processing time required to reproduce a stereophonic sound to be perceived by a user can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
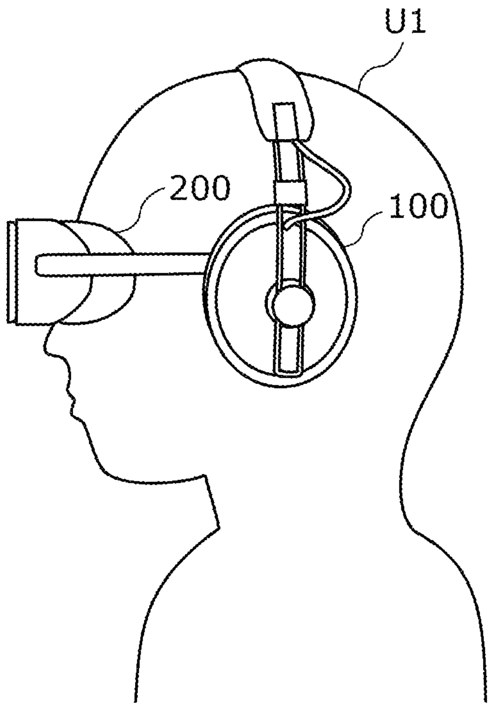
FIG. 1 is a schematic view illustrating a use case of a sound reproducing apparatus according to an embodiment.

DESCRIPTION OF EMBODIMENT (Underlying Knowledge Forming Basis of the Present Disclosure)

Conventionally, there has been a known technique for audio reproduction for causing a user to perceive a stereophonic sound by controlling a position of a sound image, which is a sound source object for the user's sense, in a virtual three-dimensional space (hereinafter referred to as a virtual space) (for example, see PTL 1). With the sound image being localized at a predetermined position in the virtual space, the user can perceive the sound as if it came from a direction that is in parallel to a straight line passing through the predetermined position and the user (i.e. predetermined direction). To localize the sound image at a predetermined position in the virtual space in this way, calculation is necessary to produce time difference in incoming sounds between ears, difference in sound levels between ears, and other factors, on collected sounds in a manner that creates a perception of a stereophonic sound.

Recently, efforts in the development of virtual reality (VR)-related technologies have been actively underway. In the virtual reality, the primary purpose has been that positions in the virtual space do not follow the user's movement and the user can experience as if the user was moving in the virtual space. In particular, in such virtual reality technologies, attempts have been made to incorporate audible elements into visual elements to enhance presence.

In simulating acoustic characteristics in such a virtual space, it is conceivable to use room impulse responses (RIR) according to a shape of the virtual space to enhance existence of a sound source object in the virtual space and the reality of the virtual space. Exemplary methods for accurately reproducing acoustic characteristics in the virtual space include, for example, those methods that are based on a wave-acoustics theory such as the Boundary Element Method, the Finite Element Method, or the Finite-Difference Time-Domain method. However, problems with those methods are that the computational amount tends to be enormous, and it is difficult to generate room impulse responses particularly in high sound regions with respect to a complex shape of the virtual space.

On the other hand, exemplary methods for simulating acoustic characteristics in the virtual space with a relatively small computational amount include, for example, those methods that are based on a geometrical acoustics theory such as a sound ray tracing method or an image source method. However, even those methods suffer from a problem of difficulty in computing and generating room impulse responses in real time in the virtual space in a 6 degrees of freedom (DoF) environment, for example, in which a sound source object moves or the user moves, based on the virtual space. Since it is difficult to generate room impulse responses in real time, it is also difficult to reproduce a stereophonic sound to be perceived by the user in real time.

In view of the above-described circumstances, an object of the present disclosure is to provide an information processing method and the like capable of reducing processing time required to reproduce a stereophonic sound to be perceived by a user by reducing a processing load required to generate room impulse responses.

More specifically, in accordance with an aspect of the present disclosure, an information processing method includes: obtaining spatial information indicating a shape of a virtual space including an obstacle and a sound source object that emits a predetermined sound; obtaining position information indicating a position and an orientation of a user in the virtual space; and generating an acoustic virtual environment by determining, based on the position and the orientation of the user and a position of the obstacle in the virtual space, a position of a virtual reflection surface off which the predetermined sound is reflected in the virtual space.

In this way, in computing acoustic characteristics (in the embodiment, room impulse response) in an acoustic virtual environment, an obstacle has already been converted to a virtual reflection surface in the acoustic virtual environment, which eliminates a need of computation to determine whether a reflection of the predetermined sound from the obstacle arrives at the listener within a predetermined number of reflections. Accordingly, it is advantageous that a processing load required to compute acoustic characteristics can be reduced, and processing time required to reproduce a stereophonic sound to be perceived by a user can be reduced.

For example, it is possible that in the generating of the acoustic virtual environment, the position of the virtual reflection surface is determined based on whether the obstacle is in front of or behind the user in the virtual space.

In this way, it is advantageous that effects of an obstacle on a stereophonic sound to be perceived by a user can easily be reflected on acoustic characteristics in the acoustic virtual environment.

For example, it is also possible that when the obstacle is in front of the user and is not located between the user and the sound source object in the virtual space, in the generating of the acoustic virtual environment, the position of the virtual reflection surface in a depth direction with respect to the user in the virtual space is determined to be a position passing through the position of the obstacle.

In this way, it is advantageous that, since the position of a virtual reflection surface in the acoustic virtual environment is determined based on the position of an obstacle that a user can visually grasp, effects of the obstacle on a stereophonic sound to be perceived by the user can more easily be reflected on acoustic characteristics in the acoustic virtual environment.

For example, it is also possible that when the obstacle is behind the user and is located on a straight line passing through the user and the sound source object, in the generating of the acoustic virtual environment, the position of the virtual reflection surface in a lateral direction with respect to the user in the virtual space is determined to be a position passing through the position of the obstacle.

In this way, it is advantageous that, since the position of a virtual reflection surface in the acoustic virtual environment is determined based on the position of an obstacle that can be most influential to audio that can be perceived by a user among obstacles behind the user, effects of the obstacle on a stereophonic sound to be perceived by the user can more easily be reflected on acoustic characteristics in the acoustic virtual environment.

For example, it is also possible that the information processing method further includes: generating a room impulse response for the sound source object by performing geometrical acoustic simulation using an image source method in the acoustic virtual environment generated; and generating a sound signal to be perceived by the user, by performing convolution of the predetermined sound with the room impulse signal generated and a head impulse response.

In this way, it is advantageous that a processing load needed to compute acoustic characteristics is smaller than in the case in which the acoustic characteristics in the acoustic virtual environment are computed based on the wave-acoustics theory.

For example, it is also possible that the generating of the room impulse response includes setting a reflectance of the predetermined sound off the virtual reflection surface to a reflectance of the predetermined sound off the obstacle located on the virtual reflection surface.

In this way, it is advantageous that effects of an obstacle on a stereophonic sound to be perceived by a user can more easily be reflected on acoustic characteristics in the acoustic virtual environment.

For example, it is also possible that when a plurality of obstacles including the obstacle are located on the virtual reflection surface, the generating of the room impulse response includes setting a reflectance of the predetermined sound off the virtual reflection surface based on a distance between the plurality of obstacles.

In this way, it is advantageous that sound in a frequency band that has difficulty in passing between a plurality of obstacles can be reflected on the reflectance of the predetermined sound off the virtual reflection surface, for example, so that effects of obstacles on a stereophonic sound to be perceived by a user can more easily be reflected on acoustic characteristics in the acoustic virtual environment.

In accordance with another aspect of the present disclosure, a non-transitory computer-readable recording medium having recorded thereon a program for causing a computer to perform the above-described information processing method.

In this way, it is advantageous that a similar effect to the above-described information processing method can be produced.

In accordance with still another aspect of the present disclosure, an information processing system includes: a spatial information obtainer that obtains spatial information indicating a shape of a virtual space including an obstacle and a sound source object that emits a predetermined sound; a position information obtainer that obtains position information indicating a position and an orientation of a user in the virtual space; and a space generator that generates an acoustic virtual environment by determining, based on the position and the orientation of the user and a position of the obstacle in the virtual space, a position of a virtual reflection surface off which the predetermined sound is reflected in the virtual space.

In this way, it is advantageous that a similar effect to the above-described information processing method can be produced.

General or specific aspects of the present disclosure may be implemented to a system, a device, a method, an integrated circuit, a computer program, a non-transitory computer-readable recording medium such as a Compact Disc-Read Only Memory (CD-ROM), or any given combination thereof.

Hereinafter, a certain exemplary embodiment will be described in detail with reference to the accompanying Drawings. The following embodiment is a general or specific example of the present disclosure. The numerical values, shapes, materials, elements, arrangement and connection configuration of the elements, steps, the order of the steps, etc., described in the following embodiment are merely examples, and are not intended to limit the present disclosure. Among elements in the following embodiment, those not described in any one of the independent claims indicating the broadest concept of the present disclosure are described as optional elements. Note that the respective figures are schematic diagrams and are not necessarily precise illustrations. Additionally, components that are essentially the same share like reference signs in the figures. Accordingly, overlapping explanations thereof are omitted or simplified.

Embodiment

Outline

First, a sound reproducing apparatus according to the embodiment will be outlined with reference to FIG. 1. FIG. 1 is a schematic view illustrating a use case of the sound reproducing apparatus in the embodiment. FIG. 1 illustrates user U1 who uses sound reproducing apparatus 100.

Sound reproducing apparatus 100 illustrated in FIG. 1 is used with stereoscopic image reproducing apparatus 200 at the same time. Viewing a stereoscopic image and listening to a stereophonic sound at the same time, user U1 can have an experience as if being at the site where the image and the sound were taken because the image and the sound enhance an audible presence and a visual presence, respectively. For example, while an image (moving image) in which a person talks is displayed and even when the localization of a sound image of the talking sound is displaced from a mouth area of the person, it has been known that user U1 perceives the sound as the talking sound emitted from the mouth of the person. In this way, the presence may be enhanced by a combination of an image and a sound, such as when the position of the sound image is corrected by visual information.

Stereoscopic image reproducing apparatus 200 is an image display device worn on the head of user U1. Accordingly, stereoscopic image reproducing apparatus 200 moves in unity with the head of user U1. For example, stereoscopic image reproducing apparatus 200 is an eye-glasses type device supported by ears and the nose of user U1.

Figure 4:
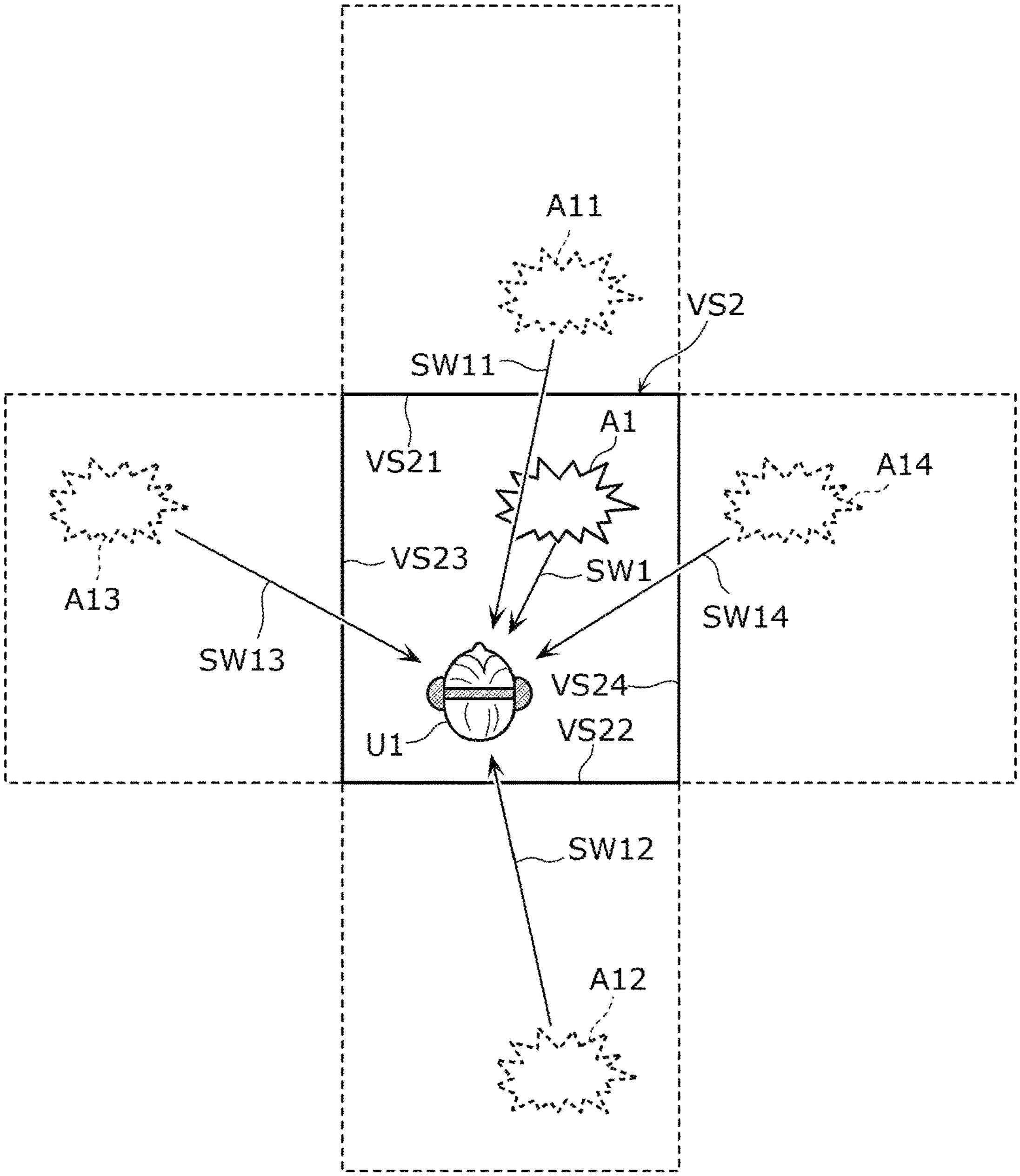
FIG. 4 is a schematic view illustrating an example of reflected sounds, according to the embodiment.

Stereoscopic image reproducing apparatus 200 changes an image displayed in response to the movement of the head of user U1 to cause user U1 to perceive as if user U1 moves the head in virtual space VS1 (see FIG. 4 or other figures). Specifically, when an object in virtual space VS1 is located in front of user U1, user U1 turning to the right causes the object to move in a left direction of user U1 and user U1 turning to the left causes the object to move in a right direction of the user. In this way, stereoscopic image reproducing apparatus 200 causes virtual space VS1 to move in the opposite direction from the movement of user U1 in response to the movement of user U1.

Stereoscopic image reproducing apparatus 200 displays two images with a parallax-equivalent displacement, one for each of right and left eyes of user U1. User U1 can perceive a three-dimensional position of an object on the images based on the parallax-equivalent displacement of the displayed images.

Sound reproducing apparatus 100 is a sound presenting device worn on the head of user U1. Accordingly, sound reproducing apparatus 100 moves in unity with the head of user U1. For example, sound reproducing apparatus 100 in the embodiment is a device of a type what is known as over-ear headphone. Sound reproducing apparatus 100 is not particularly limited in its form, and may be, for example, two earbud-type devices put in right and left ears of user U1, independently. The two devices communicate with each other to present a sound for the right ear and a sound for the left ear in synchronization with each other.

Sound reproducing apparatus 100 changes a sound presented in response to the movement of the head of user U1 to cause user U1 to perceive as if user U1 moved the head in virtual space VS1. To do so, as described above, sound reproducing apparatus 100 causes virtual space VS1 to move in the opposite direction from the movement of the user in response to the movement of user U1.

Configuration

Figure 2:
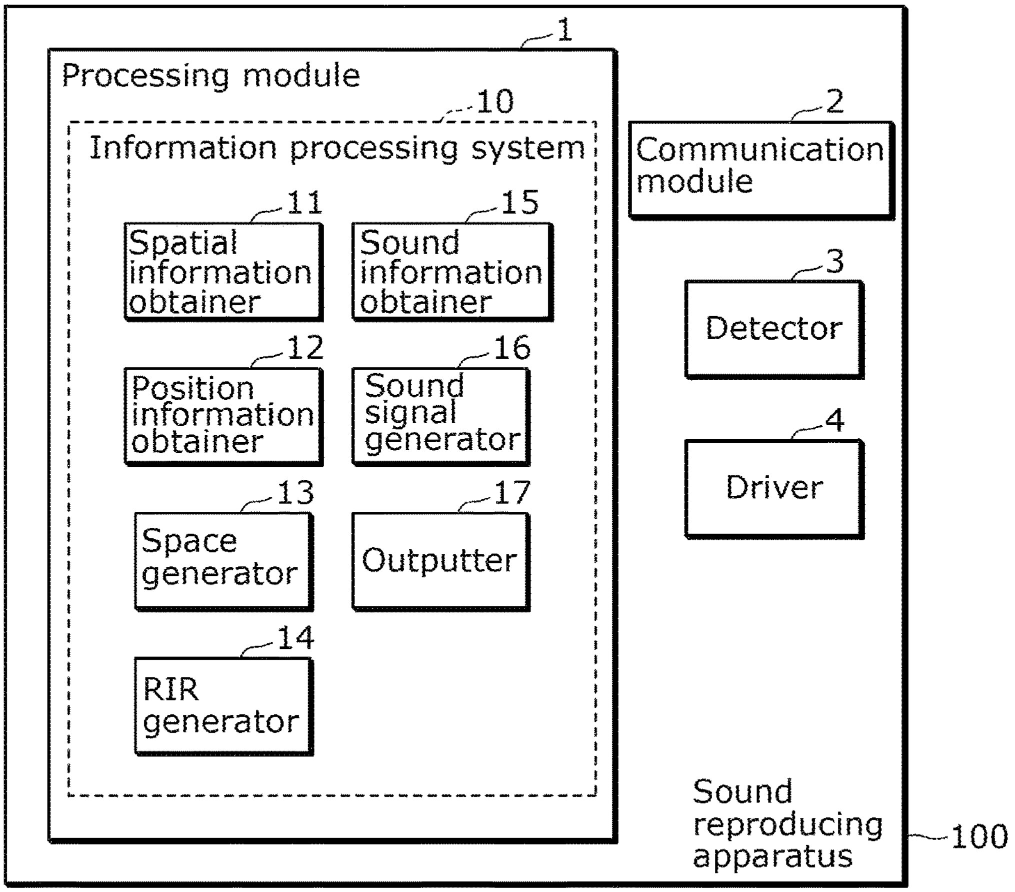
FIG. 2 is a block diagram illustrating a functional configuration of the sound reproducing apparatus that includes an information processing system according to the embodiment.

Next, a configuration of sound reproducing apparatus 100 according to the embodiment will be described with reference to FIG. 2. FIG. 2 is a block diagram illustrating a functional configuration of sound reproducing apparatus 100 that includes information processing system 10 according to the embodiment. As illustrated in FIG. 2, sound reproducing apparatus 100 according to the embodiment includes processing module 1, communication module 2, detector 3, and driver 4.

Processing module 1 is a computing apparatus for performing various signal processing in sound reproducing apparatus 100. Processing module 1 includes, for example, a processor and a memory, and achieves various functions by a program stored in the memory being executed by the processor.

Processing module 1 functions as information processing system 10 that includes spatial information obtainer 11, position information obtainer 12, space generator 13, RIR generator 14, sound information obtainer 15, sound signal generator 16, and outputter 17. Details of functional elements included in information processing system 10 will be described below together with details of configurations other than processing module 1.

Communication module 2 is an interface apparatus for accepting input of sound information and input of spatial information to sound reproducing apparatus 100. Communication module 2 includes, for example, an antenna and a signal converter, and receives the sound information and the spatial information from an external apparatus through wireless communication. More specifically, by using the antenna, communication module 2 receives a wireless signal indicative of sound information converted into a format for wireless communication, and uses the signal converter to convert the wireless signal back into the sound information. In this way, sound reproducing apparatus 100 obtains sound information from an external apparatus through wireless communication. In the same way, by using the antenna, communication module 2 receives a wireless signal indicative of spatial information converted into a format for wireless communication, and uses the signal converter to convert the wireless signal back into the spatial information. In this way, sound reproducing apparatus 100 obtains spatial information from an external apparatus through wireless communication. The sound information and the spatial information obtained by communication module 2 are obtained by sound information obtainer 15 and spatial information obtainer 11 in processing module 1, respectively. Note that communication between sound reproducing apparatus 100 and an external apparatus may be achieved through wired communication.

The sound information obtained by sound reproducing apparatus 100 is encoded in a predetermined format such as MPEG-H 3D Audio (ISO/IEC 23008-3), for example. As an example, the encoded sound information includes information on a predetermined sound to be reproduced by sound reproducing apparatus 100. The predetermined sound referenced herein is a sound emitted by sound source object A1 located in virtual space VS1 (see FIG. 3 or other figures), and may include, for example, natural environmental sounds, machine sounds, sounds and voices of an animal including a human, or the like. Note that when a plurality of sound source objects A1 are located in virtual space VS1, sound reproducing apparatus 100 will obtain plural pieces of sound information each corresponding to each of the plurality of sound source objects A1.

Detector 3 is an apparatus for sensing a motion speed of the head of user U1. Detector 3 is formed by combining various sensors that are used to sense movement such as a gyro sensor, or an acceleration sensor. Although incorporated in sound reproducing apparatus 100 in the embodiment, detector 3 may be incorporated in an external apparatus such as stereoscopic image reproducing apparatus 200 that operates in response to the movement of the head of user U1 as in sound reproducing apparatus 100, for example. In this case, detector 3 may not be included in sound reproducing apparatus 100. Further, an external imaging apparatus or the like may be used as detector 3 to capture the movement of the head of user U1, and the movement of user U1 may be sensed by processing the captured image.

For example, detector 3 is integrally fixed to a housing of sound reproducing apparatus 100, and senses a speed of movement of the housing. Sound reproducing apparatus 100 including the housing moves in unity with the head of user U1 after being worn by user U1, and consequently detector 3 can sense the speed of movement of the head of user U1.

For example, as an amount of movement of the head of user U1, detector 3 may sense an amount of rotation taking, as a rotation axis, at least one of three axes that are orthogonal to each other in virtual space VS1, or may sense an amount of displacement taking the at least one of three axes as a displacement direction. Detector 3 may sense both the amount of rotation and the amount of displacement as the amount of movement of the head of user U1.

Driver 4 includes a driver for the right ear of user U1 and a driver for the left ear of user U1. The right-ear driver and the left-ear driver each include, for example, a diaphragm and a driving mechanism such as a magnet or a voice coil. The right-ear driver operates the driving mechanism in response to a sound signal for the right ear, and allows the driving mechanism to vibrate the diaphragm. The left-ear driver operates the driving mechanism in response to a sound signal for the left ear, and allows the driving mechanism to vibrate the diaphragm. In this way, each driver relies on the vibration of the diaphragm in response to the sound signal to generate sound waves. The sound waves propagate through the air or the like and reach the ears of user U1, and user U1 perceives the sound.

Figure 6:
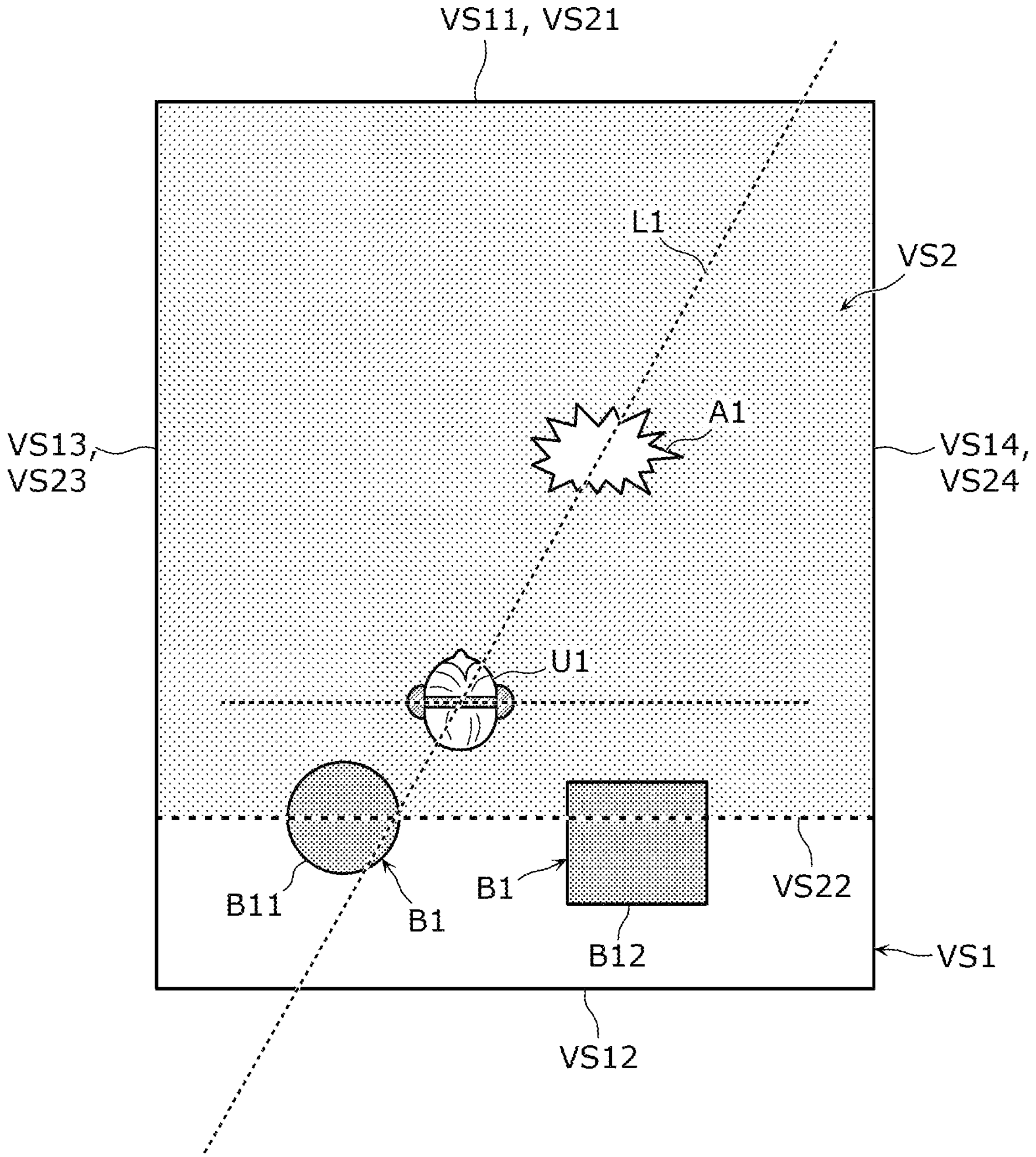
FIG. 6 is a schematic view illustrating a first generated example of an acoustic virtual environment according to the embodiment.

Spatial information obtainer 11 obtains spatial information representing the shape of virtual space VS1, which includes sound source object A1 that emits a predetermined sound and obstacle B1 (see FIG. 6 or other figures). Here, obstacle B1 is an object that can obstruct a predetermined sound, reflect the predetermined sound, or otherwise affect a stereophonic sound that the user can perceive until the predetermined sound emitted by sound source object A1 reaches user U1. In addition to a stationary object, obstacle B1 may include an animal such as a human or a moving body such as a machine. Further, when a plurality of sound source objects A1 are located in virtual space VS1, any one sound source object A1 sees other sound source objects A1 as obstacles B1.

The spatial information includes mesh information representing the shape of virtual space VS1, the shape and position of obstacle B1 located in virtual space VS1, and the shape and position of sound source object A1 located in virtual space VS1. Virtual space VS1 may be either a closed space or an open space, although it is considered as a closed space for explanation here. Further, the spatial information includes information representing a reflectance of a structure that can reflect a sound in virtual space VS1 such as a floor, a wall, or a ceiling, and a reflectance of obstacle B1 located in virtual space VS1, for example. Here, the reflectance is an energy ratio between a reflected sound and an incident sound, and is set for each frequency band of the sound. Needless to say, the reflectance may be set uniformly regardless of the frequency band of the sound.

Here, in the mesh information included in the spatial information, a mesh density of virtual space VS1 may be smaller than a mesh density of virtual space VS1 used in stereoscopic image reproducing apparatus 200. For example, in virtual space VS1 based on the spatial information obtained by spatial information obtainer 11, a plane including irregularity may be represented as a simple plane without irregularity, and the shape of an object located in virtual space VS1 may be represented as a simple shape such as a sphere.

Position information obtainer 12 obtains the motion speed of the head of user U1 from detector 3. More specifically, position information obtainer 12 obtains the amount of movement of the head of user U1 sensed by detector 3 per unit time as the speed of movement. In this way, position information obtainer 12 obtains at least one of the rotational speed and the displacement speed from detector 3. The amount of movement of the head of user U1 obtained here is used to determine coordinates and an orientation of user U1 in virtual space VS1. Specifically, position information obtainer 12 obtains position information representing the position and the orientation of user U1 in virtual space VS1.

Based on the position and the orientation of user U1 and the position of obstacle B1 in virtual space VS1, space generator 13 determines the position of a virtual reflection surface off which the predetermined sound is reflected in virtual space VS1 to generate acoustic virtual environment VS2 (see FIG. 6 or other figures). Specifically, when obstacle B1 is located in virtual space VS1, space generator 13 changes the position of the virtual reflection surface in virtual space VS1 based on the position of obstacle B1 to generate acoustic virtual environment VS2 that is different from virtual space VS1. When no obstacle B1 is located in virtual space VS1, space generator 13 does not change the position of the virtual reflection surface in virtual space VS1. In this case, acoustic virtual environment VS2 coincides with virtual space VS1.

In generation of acoustic virtual environment VS2 by space generator 13, the position of the virtual reflection surface is determined based on whether obstacle B1 is located in front of or behind user U1 in virtual space VS1. Specific examples of generation of acoustic virtual environment VS2 will be described later in [Generated Examples of Acoustic Virtual Environment] in detail.

RIR generator 14 generates a room impulse response for sound source object A1 by performing geometrical acoustic simulation using an image source method in acoustic virtual environment VS2 generated by space generator 13.

Figure 3:
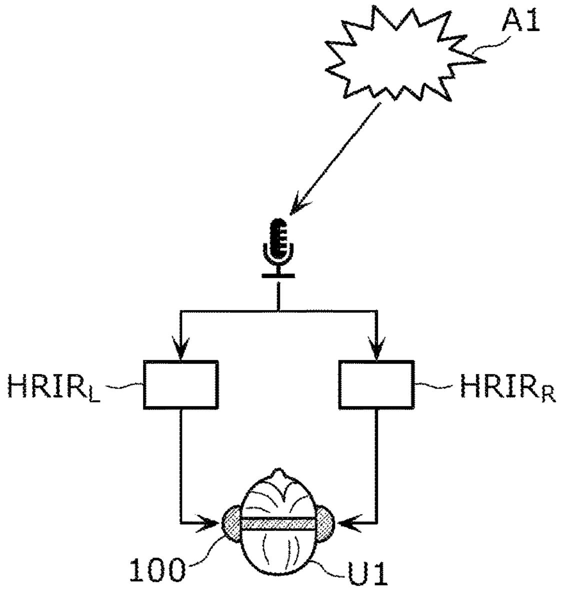
FIG. 3 is an explanatory drawing of reproduction processing of a stereophonic sound using a head impulse response, according to the embodiment.

Here, as illustrated in FIG. 3, user U1 can perceive a predetermined sound emitted by sound source object A1 as a stereophonic sound due to a sound pressure difference, a time difference, a phase difference, and the like of a sound heard by right and left ears. FIG. 3 is an explanatory drawing of reproduction processing of a stereophonic sound using a head impulse response, according to the embodiment. A sound heard by the right ear of user U1 is the sound emitted by driver 4 in response to a sound signal for the right ear. A sound heard by the left ear of user U1 is the sound emitted by driver 4 in response to a sound signal for the left ear. Then, the sound signal for the right ear is generated by performing convolution of a predetermined sound emitted by sound source object A1 with head impulse response for the right ear HRIRR and a room impulse response. The sound signal for the left ear is generated by performing convolution of the predetermined sound emitted by sound source object A1 with head impulse response for the left ear HRIRL and a room impulse response.

RIR generator 14 generates a room impulse response for sound source object A1 by performing geometrical acoustic simulation using the image source method.

Here, a generated example of a room impulse response for sound source object A1 by performing geometrical acoustic simulation using the image source method will be described with reference to FIG. 4. FIG. 4 is a schematic view illustrating an example of reflected sounds, according to the embodiment. In the example illustrated in FIG. 4, it is assumed for explanation that acoustic virtual environment VS2 is a space of a rectangular parallelepiped shape. Further, in the example illustrated in FIG. 4, it is assumed for explanation that the center of the head of user U1 is a sound receiving point. Further, here, it is assumed for explanation that there is no reflection of a sound at the floor and the ceiling in acoustic virtual environment VS2.

As illustrated in FIG. 4, acoustic virtual environment VS2 is a space surrounded by 4 walls in plan view. These 4 walls each correspond to 4 virtual reflection surfaces VS21 to VS24 in acoustic virtual environment VS2. In other words, acoustic virtual environment VS2 is surrounded by virtual reflection surfaces VS21, VS22, VS23, and VS24 that are located in front of, behind, to the left of, and to the right of user U1, respectively.

When a sound is emitted by sound source object A1, the room impulse response is represented by direct sound SW1 arriving at the position of user U1, early reflection including first-order reflected sounds SW1*l* to SW14 at each of virtual reflection surfaces VS21 to VS24, and reverberation. Here, although the early reflection includes only the first-order reflected sounds at each of virtual reflection surface, VS21 to VS24, it may include second-order reflected sounds.

In geometrical acoustic simulation using the image source method, first-order reflected sounds SW1*l* to SW14 and reverberation are represented as direct sounds from image sound source objects A11 to A14, respectively. In other words, first-order reflected sound SW1*l* is represented as a direct sound from image sound source object A11 that exhibits plane symmetry with sound source object A1 with respect to virtual reflection surface VS21. First-order reflected sound SW12 is represented as a direct sound from image sound source object A12 that exhibits plane symmetry with sound source object A1 with respect to virtual reflection surface VS22. First-order reflected sound SW13 is represented as a direct sound from image sound source object A13 that exhibits plane symmetry with sound source object A1 with respect to virtual reflection surface VS23. First-order reflected sound SW14 is represented as a direct sound from image sound source object A14 that exhibits plane symmetry with sound source object A1 with respect to virtual reflection surface VS24.

Energies of first-order reflected sounds SW1*l* to SW14 decrease from the energy of direct sound SW1 according to reflectance values of virtual reflection surfaces VS21 to VS24, respectively. In the embodiment, regarding a virtual reflection surface whose position has been changed depending on obstacle B1 among virtual reflection surfaces VS21 to VS24, the reflectance at the virtual reflection surface is set to the reflectance at obstacle B1. Specifically, in generation of a room impulse response by RIR generator 14, the reflectance of a predetermined sound off a virtual reflection surface is set to the reflectance of the predetermined sound off obstacle B1 located on the virtual reflection surface. The reflectance at obstacle B1 is set based on a material, a size, or the like of obstacle B1 as necessary.

Figure 5:
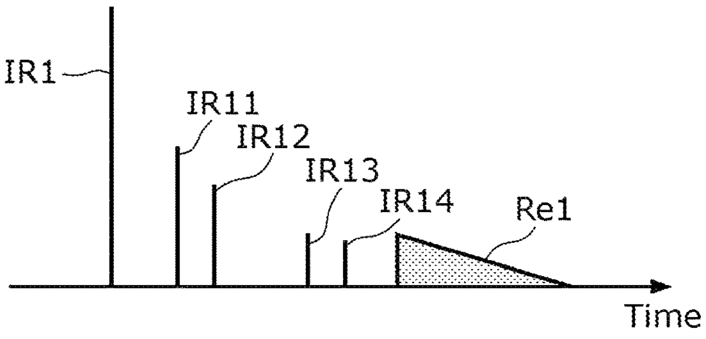
FIG. 5 is a schematic view illustrating an example of room impulse responses, according to the embodiment.

FIG. 5 is a schematic view illustrating an example of room impulse responses, according to the embodiment. In FIG. 5, the vertical axis indicates sound energy, and the horizontal axis indicates time. In FIG. 5, room impulse response IR1 is a room impulse response corresponding to direct sound SW1. Further, in FIG. 5, room impulse responses IR11, IR12, IR13, and IR14, are room impulse responses corresponding to first-order reflected sounds SW11, SW12, SW13, and SW14, respectively. Note that, instead of acoustic virtual environment VS2, reverberation Ret in FIG. 5 may be generated in any geometrical acoustic simulation based on virtual space VS1 or signal processing for generating reverberation sound.

Sound information obtainer 15 obtains the sound information obtained by communication module 2. Specifically, sound information obtainer 15 decodes the encoded sound information obtained by communication module 2 to obtain the sound information in a format used in processing in sound signal generator 16 at a subsequent stage.

Sound signal generator 16 generates a sound signal to be perceived by user U1 by performing convolution of a predetermined sound emitted by sound source object A1 included in the sound information obtained by sound information obtainer 15 with a room impulse response generated by RIR generator 14 and a head impulse response. Specifically, sound signal generator 16 generates a sound signal for the right ear by performing convolution of the predetermined sound emitted by sound source object A1 with a room impulse response from sound source object A1 to the position of user U1 generated by RIR generator 14 (here, direct sound SW1 and temporary reflected sounds SW11 to SW14) and head impulse response for the right ear HRIRR. In the same way, sound signal generator 16 generate a sound signal for the left ear by performing convolution of the predetermined sound emitted by sound source object A1 with a room impulse response generated by RIR generator 14 and head impulse response for the left ear HRIRL. The head impulse response of the right ear and the head impulse response of the left ear can be obtained, for example, by referencing those stored in advance in the memory of processing module 1 or reading them from an external database for reference.

Outputter 17 outputs the sound signal generated by sound signal generator 16 to driver 4. Specifically, outputter 17 outputs the sound signal for the right ear generated by sound signal generator 16 to the right-ear driver of driver 4. Further, outputter 17 outputs the sound signal for the left ear generated by sound signal generator 16 to the left-ear driver of driver 4.

[Generated Examples of Acoustic Virtual Environment]

Figure 7:
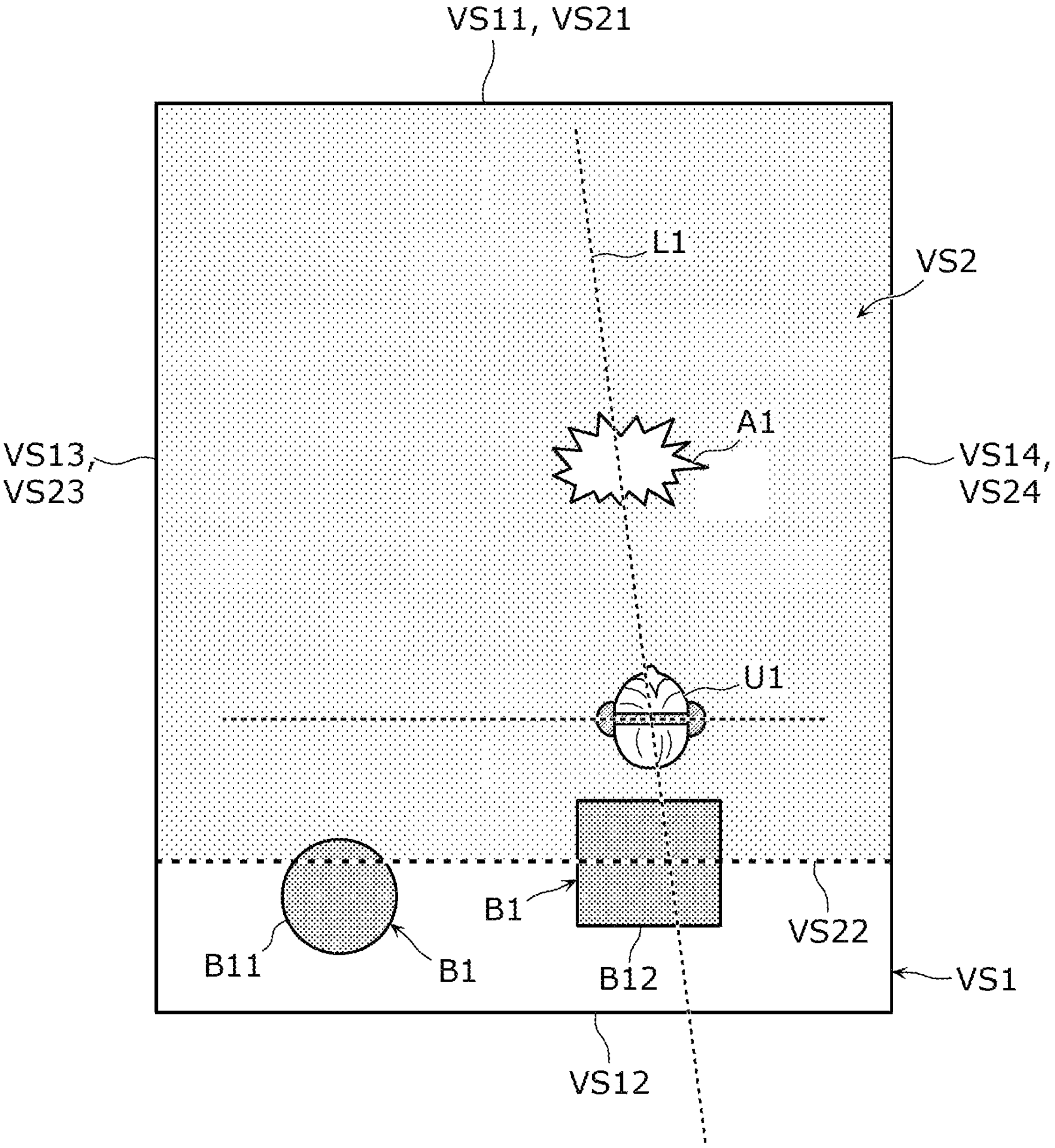
FIG. 7 is a schematic view illustrating a second generated example of the acoustic virtual environment according to the embodiment.
Figure 8:
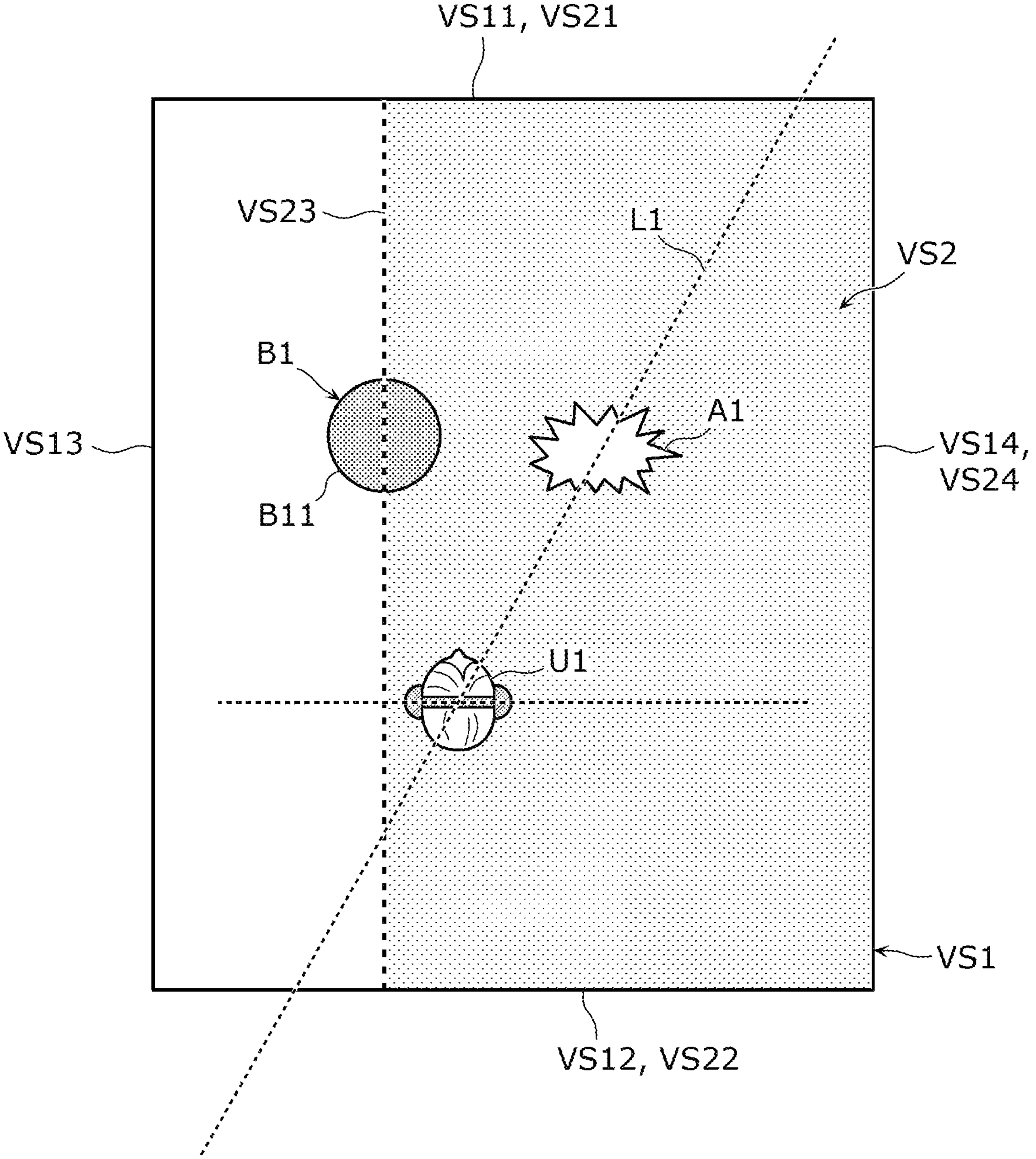
FIG. 8 is a schematic view illustrating a third generated example of the acoustic virtual environment according to the embodiment.
Figure 9:
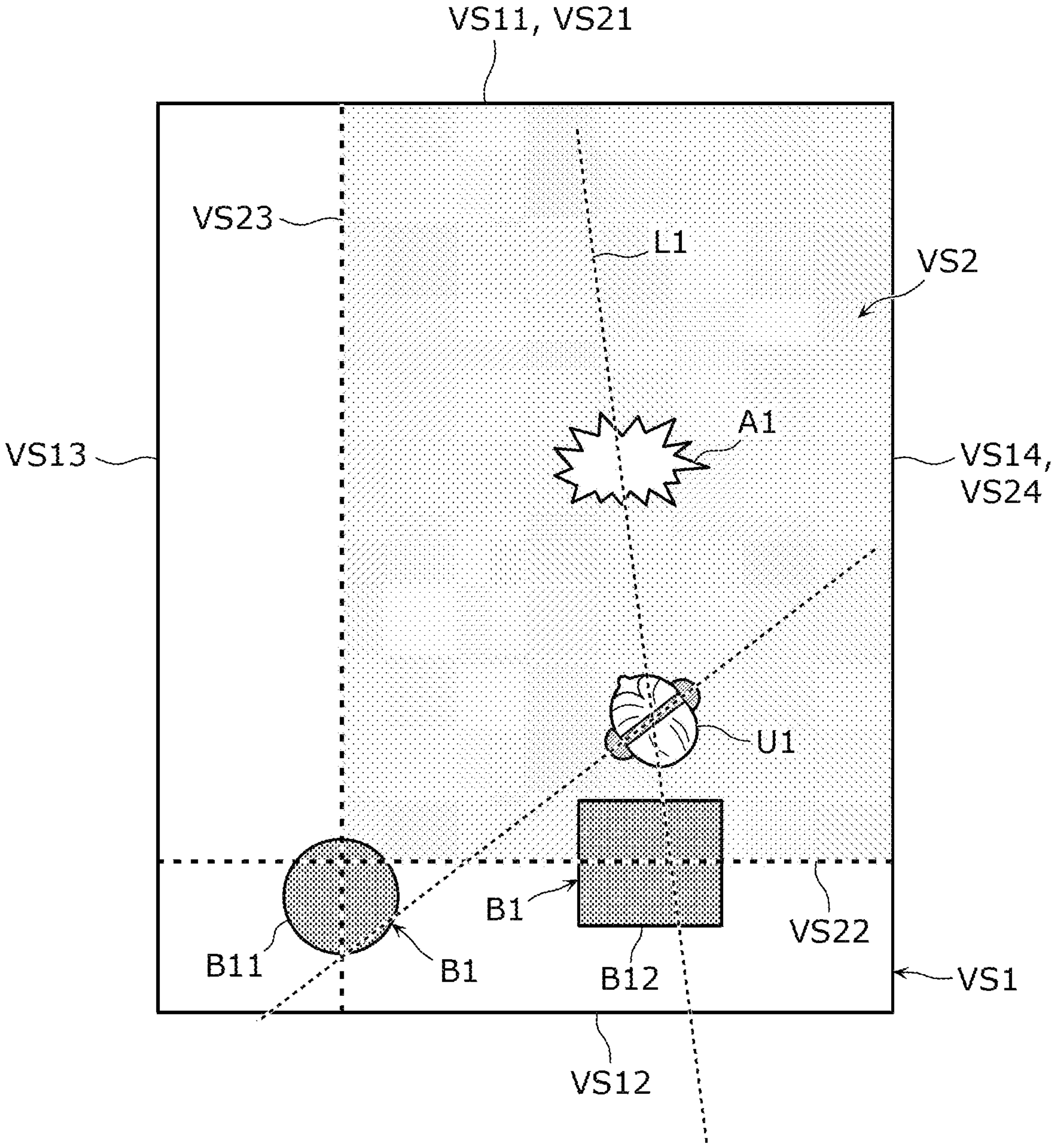
FIG. 9 is a schematic view illustrating a fourth generated example of the acoustic virtual environment according to the embodiment.

Hereinafter, generated examples of acoustic virtual environment VS2 by space generator 13 will be described with reference to FIGS. 6 to 9. FIG. 6 is a schematic view illustrating a first generated example of acoustic virtual environment VS2 according to the embodiment. FIG. 7 is a schematic view illustrating a second generated example of acoustic virtual environment VS2 according to the embodiment. FIG. 8 is a schematic view illustrating a third generated example of acoustic virtual environment VS2 according to the embodiment. FIG. 9 is a schematic view illustrating a fourth generated example of acoustic virtual environment VS2 according to the embodiment. In the example illustrated in each of FIGS. 6 to 9, it is assumed for explanation that virtual space VS1 is a space of a rectangular parallelepiped shape. Further, here, it is assumed for explanation that there is no reflection of a sound at the floor and the ceiling in virtual space VS1. In each of FIGS. 6 to 9, a dashed line passing through both ears of user U1 indicates a border separating front and back of user U1. In each of FIGS. 6 to 9, it is assumed that sound source object A1 is located in front of user U1.

In each of FIGS. 6 to 9, virtual space VS1 is a space surrounded by 4 walls in plan view. These 4 walls each correspond to 4 virtual reflection surfaces VS11 to VS14 in virtual space VS1. In other words, virtual space VS1 is surrounded by virtual reflection surfaces VS11, VS12, VS13, and VS14 that are located in front of, behind, to the left of, and to the right of user U1, respectively.

In the first generated example, as illustrated in FIG. 6, two obstacles B11 and B12 are located in virtual space VS1. Two obstacles B11 and B12 are both located behind user U1. One of two obstacles B11 and B12, or obstacle B11, is located on straight line L1 passing through user U1 and sound source object A1 (specifically, passing through the center of the head of user U1 and the center of sound source object A1), while the other, or obstacle B12, is not located on straight line L1.

In the first generated example, space generator 13 determines the position of virtual reflection surface VS22 in acoustic virtual environment VS2 based on the position of obstacle B11 located on straight line L1. In other words, space generator 13 determines the position of a line that is parallel to virtual reflection surface VS12 located behind user U1 and that passes through obstacle B11 (specifically, the center of obstacle B11) located on straight line L1 as the position of virtual reflection surface VS22 in acoustic virtual environment VS2. In other words, in the first generated example, in generation of acoustic virtual environment VS2 by space generator 13, when obstacle B11 is behind user U1 and is located on straight line L1 passing through user U1 and sound source object A1, the position of virtual reflection surface VS22 in a lateral direction with respect to user U1 in virtual space VS1 is determined to be a position passing through obstacle B11.

Accordingly, in the first generated example, acoustic virtual environment VS2 is a space surrounded by virtual reflection surfaces VS21, VS23, and VS24 that coincide with virtual reflection surfaces VS11, VS13, and VS14 in virtual space VS1, respectively, and virtual reflection surface VS22 located at the position of a line that passes through obstacle B11.

As illustrated in FIG. 7, the second generated example shares a commonality with the first generated example in that two obstacles B11 and B12 are located in virtual space VS1. On the other hand, the second generated example is different from the first generated example in that user U1 has moved, and consequently, one obstacle B11 deviates from straight line L1 and other obstacle B12 is located on straight line L1.

In the second generated example, space generator 13 determines the position of a line that is parallel to virtual reflection surface VS12 located behind user U1 and that passes through obstacle B12 (specifically, the center of obstacle B12) located on straight line L1 as the position of virtual reflection surface VS22 in acoustic virtual environment VS2. Accordingly, in the second generated example, acoustic virtual environment VS2 is a space surrounded by virtual reflection surfaces VS21, VS23, and VS24 that coincide with virtual reflection surfaces VS11, VS13, and VS14 in virtual space VS1, respectively, and virtual reflection surface VS22 located at the position of a line that passes through obstacle B12.

In the third generated example, as illustrated in FIG. 8, one obstacle B11 is located in virtual space VS1. Obstacle B11 is located in front of user U1 and is not located between user U1 and sound source object A1.

In the third generated example, space generator 13 determines the position of virtual reflection surface VS23 in acoustic virtual environment VS2 based on the position of obstacle B11 located in front of user U1. In other words, space generator 13 determines the position of a line that is parallel to virtual reflection surface VS13 located to the left of user U1 and that passes through obstacle B11 (specifically, the center of obstacle B11) located in front of user U1 as the position of virtual reflection surface VS23 in acoustic virtual environment VS2.

In brief, in the third generated example, in generation of acoustic virtual environment VS2 by space generator 13, when obstacle B11 is located in front of user U1 in virtual space VS1 and obstacle B11 is not located between user U1 and sound source object A1, the position of virtual reflection surface VS23 in a depth direction with respect to user U1 in virtual space VS1 is determined to be a position passing through the position of obstacle B11.

Accordingly, in the third generated example, acoustic virtual environment VS2 is a space surrounded by virtual reflection surfaces VS21, VS22, and VS24, that coincide with virtual reflection surfaces VS11, VS12, and VS14 in virtual space VS1, respectively, and virtual reflection surface VS23 located at the position of a line that passes through obstacle B11.

When obstacle B11 is located to the right of sound source object A1, space generator 13 determines the position of a line that is parallel to virtual reflection surface VS14 located to the right of user U1 and that passes through obstacle B11 (specifically, the center of obstacle B11) located in front of user U1 as the position of virtual reflection surface VS24 in acoustic virtual environment VS2.

Further, when a plurality of obstacles B1 are located in one of the right and left directions with respect to user U1 or sound source object A1, space generator 13 determines the position of a line that passes through obstacle B1 that is the closest to user U1 among the plurality of obstacles B1 as virtual reflection surface in acoustic virtual environment VS2.

As illustrated in FIG. 9, the fourth generated example shares a commonality with the second generated example in that two obstacles B11 and B12 are located in virtual space VS1. On the other hand, the fourth generated example is different from the second generated example in that the orientation of user U1 is different from that in the second generated example, and consequently, one obstacle B11 is located in front of user U1.

In the fourth generated example, space generator 13 determines the position of a line that is parallel to virtual reflection surface VS13 located to the left of user U1 and that passes through obstacle B11 (specifically, the center of obstacle B11) located in front of user U1 as virtual reflection surface VS23 in acoustic virtual environment VS2. Further, space generator 13 determines the position of a line that is parallel to virtual reflection surface VS12 located behind user U1 and that passes through obstacle B12 (specifically, the center of obstacle B12) located on straight line L1 as virtual reflection surface VS22 in acoustic virtual environment VS2. Accordingly, in the fourth generated example, acoustic virtual environment VS2 is a space surrounded by virtual reflection surfaces VS11 and VS14 that coincide with virtual reflection surfaces VS11 and VS14 in virtual space VS1, respectively, virtual reflection surface VS23 located at the position of a line that passes through obstacle B11, and virtual reflection surface VS22 located at the position of a line that passes through obstacle B12.

Note that in the above description of virtual reflection surfaces, although the position of a line that passes through the center of an obstacle is determined as the position of a virtual reflection surface as a specific example of the position of a line that passes through the obstacle, any position may be chosen only if the position of a line passes through the obstacle, and the position may not necessarily be the position of a line that passes through the center of the obstacle.

Operation

Figure 10:
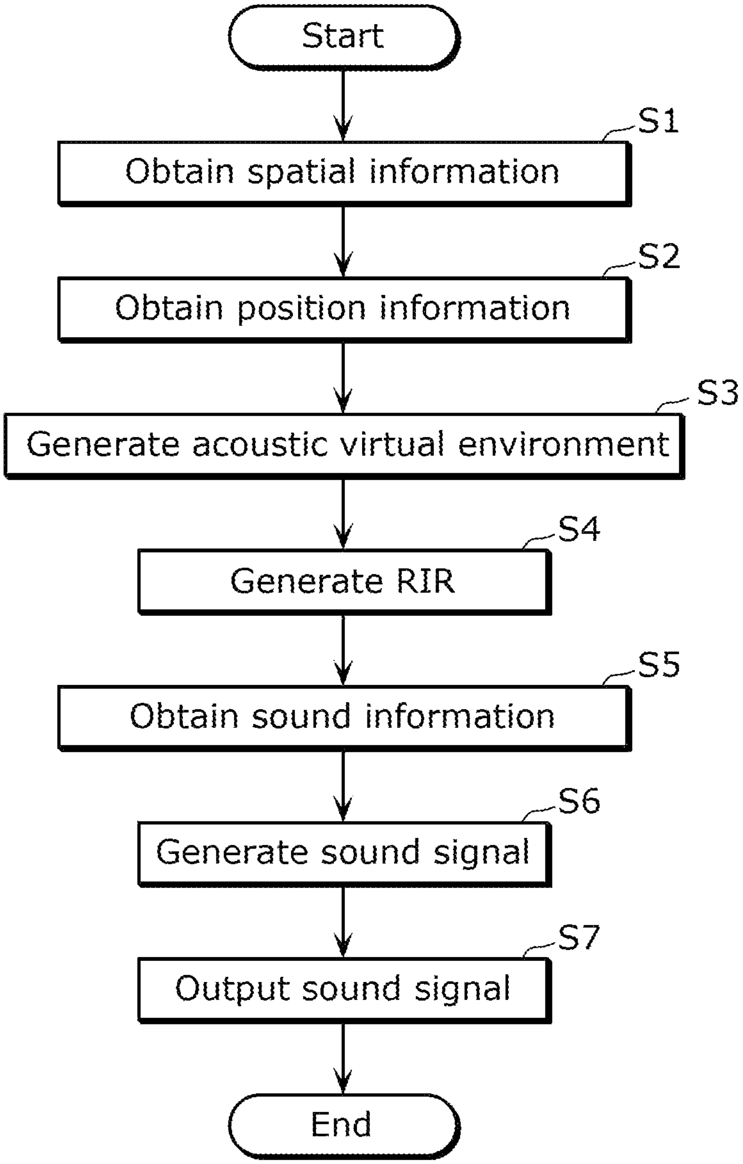
FIG. 10 is a flow chart illustrating an exemplary operation of the information processing system according to the embodiment.

Hereinafter, an operation of information processing system 10 according to the embodiment, that is, an information processing method will be described with reference to FIG. 10. FIG. 10 is a flow chart illustrating an exemplary operation of information processing system 10 according to the embodiment. First, once sound reproducing apparatus 100 starts to operate, spatial information obtainer 11 obtains the spatial information through communication module 2 (S1). Further, position information obtainer 12 obtains the position information by obtaining a motion speed of the head of user U1 from detector 3 (S2). Step S1 and step S2 may not necessarily be executed in this order, and may be executed in the reverse order or in parallel to each other simultaneously.

Next, based on the obtained spatial information and position information, space generator 13 generates acoustic virtual environment VS2 (S3). Specifically, in step S3, acoustic virtual environment VS2 is generated by determining the position of a virtual reflection surface off which the predetermined sound is reflected in virtual space VS1 based on the position and the orientation of user U1 and the position of obstacle B1 in virtual space VS1. Here, when obstacle B1 is located in virtual space VS1, a virtual reflection surface in acoustic virtual environment VS2 is determined by translating the virtual reflection surface in virtual space VS1 depending on the position of obstacle B1.

Next, in generated acoustic virtual environment VS2, RIR generator 14 generates a room impulse response for sound source object A1 by performing geometrical acoustic simulation using the image source method (S4). Sound information obtainer 15 obtains the sound information through communication module 2 (S5). Step S4 and step S5 may not necessarily be executed in this order, and may be executed in the reverse order or in parallel to each other simultaneously. Further, step S5 may be executed simultaneously when the position information is obtained at step S2.

Next, sound signal generator 16 generates a sound signal by performing convolution of a predetermined sound emitted by sound source object A1 included in the sound information obtained by sound information obtainer 15 with a room impulse response generated by RIR generator 14 and a head impulse response (S6). Specifically, sound signal generator 16 generates a sound signal for the right ear by performing convolution of a predetermined sound emitted by sound source object A1 with a room impulse response generated by RIR generator 14 and head impulse response for the right ear HRIRR. Further, sound signal generator 16 generates a sound signal for the left ear by performing convolution of a predetermined sound emitted by sound source object A1 with a room impulse response generated by RIR generator 14 and head impulse response for the left ear HRIRL.

Outputter 17 outputs the sound signal generated by sound signal generator 16 to driver 4 (S7). Specifically, outputter 17 outputs the sound signal for the right ear and the sound signal for the left ear generated by sound signal generator 16 to the right-ear driver and the left-ear driver of driver 4, respectively.

Thereafter, during sound reproducing apparatus 100 is operated, step S1 to step S7 are repeated. In this way, user U1 can perceive the predetermined sound emitted by sound source object A1 in virtual space VS1 as a stereophonic sound in real time.

Advantages

Hereinafter, advantages of information processing system 10 (information processing method) according to the embodiment will be described together with a comparison with a comparative example information processing system. The comparative example information processing system is different from information processing system 10 according to the embodiment in that the comparative example information processing system does not include space generator 13, that is, does not generate acoustic virtual environment VS2. When the comparative example information processing system is used, a room impulse response for sound source object A1 will be generated by performing geometrical acoustic simulation using the image source method in virtual space VS1. In this case, a processing load required to generate a room impulse response tends to be large because not only reflection of the predetermined sound at a virtual reflection surface in virtual space VS1 but also reflection of the predetermined sound at obstacle B1 must be computed. Accordingly, in the comparative example information processing system, due to a large processing load as described above, it is difficult to generate a room impulse response in real time when sound source object A1 moves or user U1 moves in virtual space VS1. Then, the problem with the comparative example information processing system is that since it is difficult to generate a room impulse response in real time, it is difficult to reproduce a stereophonic sound to be perceived by user U1 in real time based on the room impulse response.

In contrast, in information processing system 10 (information processing method) according to the embodiment, acoustic virtual environment VS2 is generated by determining the position of a virtual reflection surface based on the position and the orientation of user U1 and the position of obstacle B1 in virtual space VS1. Accordingly, when information processing system 10 according to the embodiment is used, a room impulse response for sound source object A1 will be generated by performing geometrical acoustic simulation using the image source method in acoustic virtual environment VS2. In this case, obstacle B1 has already been converted to a virtual reflection surface in acoustic virtual environment VS2, which eliminates a need of computation to determine whether a reflection of the predetermined sound from obstacle B1 arrives at the listener within a predetermined number of reflections, and makes it possible to reduce the processing load required to generate a room impulse response as compared to the comparative example information processing system. Accordingly, in information processing system 10 according to the embodiment, it is advantageous that processing time required to reproduce a stereophonic sound to be perceived by user U1 can be reduced.

Accordingly, in information processing system 10 (information processing method) according to the embodiment, even in cases such as when sound source object A1 moves or user U1 moves in virtual space VS1, a room impulse response can easily be generated in real time due to a small processing load as described above. Then, in information processing system 10 according to the embodiment, since a room impulse response can easily be generated in real time, it is advantageous that a stereophonic sound to be perceived by the user based on a head impulse response can easily be reproduced in real time.

Other Embodiments

The embodiment has been described above, but the present disclosure is not limited to the embodiment described above.

For example, in the embodiment described above, when a plurality of (here, two) obstacles B1 are located on a virtual reflection surface in acoustic virtual environment VS2, RIR generator 14 may set a reflectance of the predetermined sound off the virtual reflection surface based on a distance between the plurality of obstacles B1. Specifically, in generation of a room impulse response by RIR generator 14, when a plurality of obstacles B1 are located on the virtual reflection surface, the reflectance of the predetermined sound off the virtual reflection surface may be set based on distance d1 between the plurality of obstacles B1 (see FIG. 11).

Figure 11:
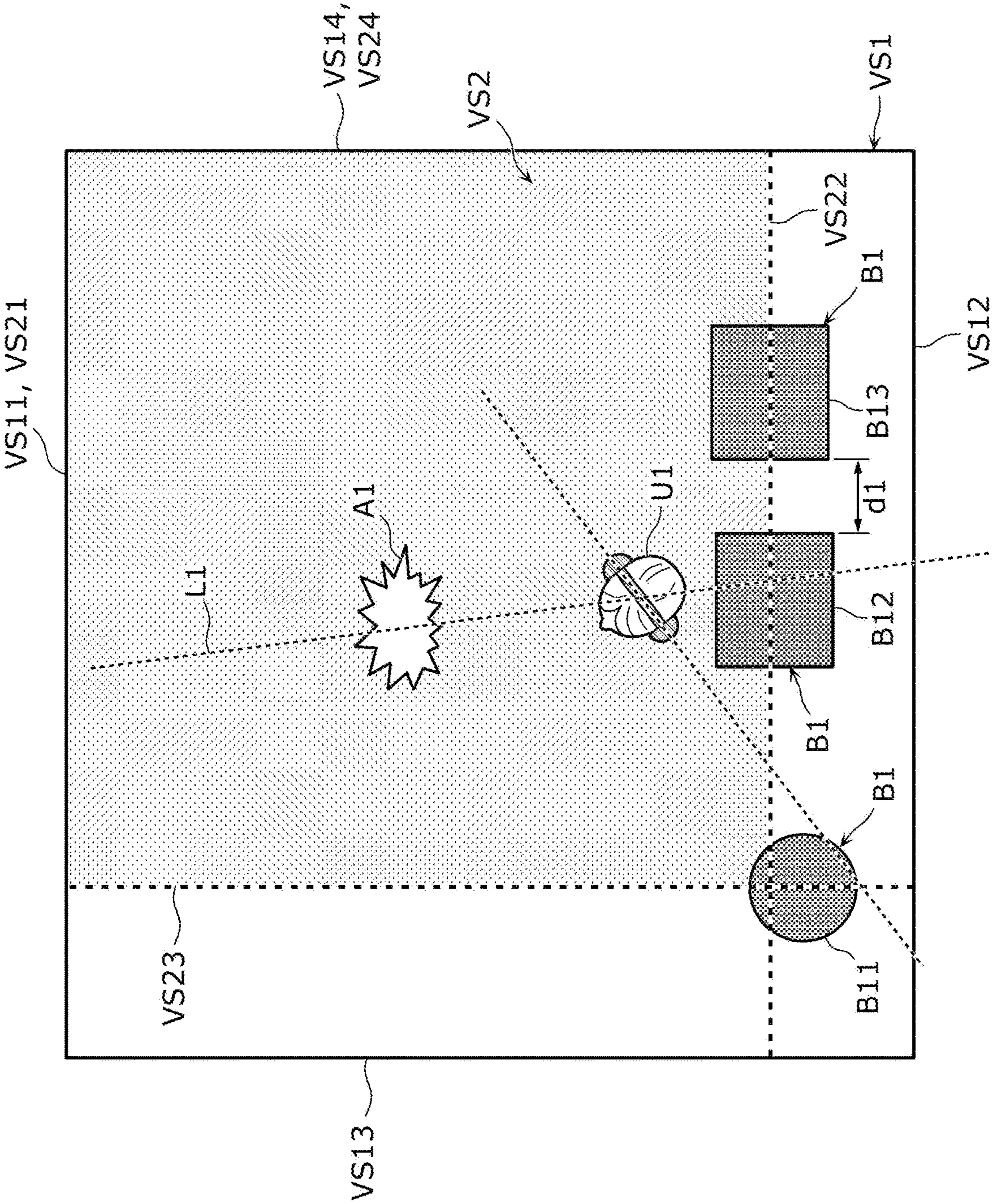
FIG. 11 is a schematic view illustrating an example of an acoustic virtual environment according to a variation of the embodiment.

FIG. 11 is a schematic view illustrating an example of acoustic virtual environment VS2 according to a variation of the embodiment. In the example illustrated in FIG. 11, acoustic virtual environment VS2 is the same as acoustic virtual environment VS2 generated in the fourth generated example described above. On the other hand, in the example illustrated in FIG. 11, further obstacle B13 is located in virtual space VS1 in addition to obstacle B11 and B12. Obstacle B13 is arranged alongside obstacle B12 at an interval of distance d1 on virtual reflection surface VS22 in acoustic virtual environment VS2. In the example illustrated in FIG. 11, RIR generator 14 sets the reflectance of the predetermined sound off virtual reflection surface VS22 based on distance d1 between two obstacles B12 and B13.

In this way, when the reflectance of the predetermined sound off the virtual reflection surface is set based on distance d1 between the plurality of obstacles B1, it is possible to reflect a sound in a frequency band that has difficulty in passing between the plurality of obstacles B1 on the reflectance of the predetermined sound off the virtual reflection surface by, for example, reducing the reflectance of a sound in a frequency band when a wavelength thereof exceeds distance d1, or the like.

For example, in the embodiment described above, even when RIR generator 14 changes the position of virtual reflection surface based on the position of obstacle B1, RIR generator 14 may set the reflectance at the virtual reflection surface in acoustic virtual environment VS2 to the reflectance at the virtual reflection surface before the change is made.

For example, in the embodiment described above, assume that when space generator 13 determines the position of obstacle B1 located behind user U1 as the position of the virtual reflection surface in acoustic virtual environment VS2, virtual space VS1 is an open space and there is no virtual wall behind obstacle B1. In this case, space generator 13 may determine the virtual reflection surface at the position of a line that is parallel to a boundary plane indicative of the border separating front and back of user U1 and that passes through obstacle B1.

For example, the sound reproducing apparatuses described in the embodiment described above may be implemented as a single apparatus that includes all the components, or may be implemented by allocating each function to any of a plurality of apparatuses and causing the apparatuses to work together. In the latter case, as an apparatus corresponding to the processing module, an information processing apparatus such as a smartphone, a tablet terminal, or a personal computer may be used.

The sound reproducing apparatus of the present disclosure may be implemented as a sound processing apparatus that is connected to a reproducing apparatus, which includes only a driver, and is configured only to output a sound signal to the reproducing apparatus. In this case, the sound processing apparatus may be implemented as hardware provided with dedicated circuitry, or may be implemented as software for causing a general processor to execute specific processing.

In the above-described embodiment, a process performed by a certain processing unit may be performed by another processing unit. The order of a plurality of processes may be changed, or a plurality of processes may be performed in parallel.

In the above-described embodiment, each of the constituent elements may be implemented by executing a software program suitable for the constituent element. Each of the constituent elements may be realized when a program executing unit, such as a central processing unit (CPU) or a processor, reads a software program from a recording medium, such as a hard disk or a semiconductor memory, and executes the readout software program.

Each of the constituent elements may be implemented to hardware. For example, each constituent element may be a circuit (or integrated circuit). These circuits may form a single circuit as a whole, or serve as separate circuits. Each circuit may be a general-purpose circuit or a dedicated circuit.

General or specific aspects of the present disclosure may be implemented to a system, a device, a method, an integrated circuit, a computer program, a computer-readable recording medium such as a Compact Disc-Read Only Memory (CD-ROM), or any given combination thereof.

For example, the present disclosure may be implemented to an information processing method executed by a computer, or implemented to a program that causes the computer to execute the information processing method. Furthermore, the present disclosure may be implemented to a non-transitory computer-readable recording medium storing such a program.

In addition, the present disclosure may include embodiments obtained by making various modifications on the above-described embodiment which those skilled in the art will arrive at, or embodiments obtained by selectively combining the elements and functions disclosed in the above-described embodiment, without materially departing from the scope of the present disclosure.

INDUSTRIAL APPLICABILITY

The present disclosure is useful in audio reproduction for causing a user to perceive a stereophonic sound and the like.

The invention claimed is:

1. An information processing method comprising:

obtaining spatial information indicating a shape of a first virtual space including an obstacle and a sound source object that emits a predetermined sound;

obtaining position information indicating a position and an orientation of a user in the first virtual space;

generating a second virtual space by determining, based on the position and the orientation of the user and a position of the obstacle in the first virtual space, a position of a virtual reflection surface off which the predetermined sound is reflected in the first virtual space;

generating an impulse response for the sound source object based on a shape of the second virtual space; and generating, based on the impulse response and the predetermined sound, a sound signal to be outputted.

2. The information processing method according to claim 1, wherein in the generating of the second virtual space, the position of the virtual reflection surface is determined based on whether the obstacle is in front of or behind the user in the first virtual space.

3. The information processing method according to claim 2, wherein when the obstacle is in front of the user and is not located between the user and the sound source object in the first virtual space, in the generating of the second virtual space, the position of the virtual reflection surface in a depth direction with respect to the user in the first virtual space is determined to be a position passing through the position of the obstacle.

4. The information processing method according to claim 2, wherein when the obstacle is behind the user and is located on a straight line passing through the user and the sound source object, in the generating of the second virtual space, the position of the virtual reflection surface in a lateral direction with respect to the user in the first virtual space is determined to be a position passing through the position of the obstacle.

5. The information processing method according to claim 1, further comprising:

generating a room impulse response for the sound source object by performing geometrical acoustic simulation using an image source method in the second virtual space generated; and generating a sound signal to be perceived by the user, by performing convolution of the predetermined sound with the room impulse signal generated and a head impulse response.

6. The information processing method according to claim 5, wherein the generating of the room impulse response includes setting a reflectance of the predetermined sound off the virtual reflection surface to a reflectance of the predetermined sound off the obstacle located on the virtual reflection surface.

7. The information processing method according to claim 5, wherein when a plurality of obstacles including the obstacle are located on the virtual reflection surface, the generating of the room impulse response includes setting a reflectance of the predetermined sound off the virtual reflection surface based on a distance between the plurality of obstacles.

8. A non-transitory computer-readable recording medium having recorded thereon a program for causing a computer to perform the information processing method according to claim 1.

9. An information processing system comprising:

a spatial information obtainer that obtains spatial information indicating a shape of a first virtual space including an obstacle and a sound source object that emits a predetermined sound;

a position information obtainer that obtains position information indicating a position and an orientation of a user in the first virtual space;

a space generator that generates a second virtual space by determining, based on the position and the orientation of the user and a position of the obstacle in the first virtual space, a position of a virtual reflection surface off which the predetermined sound is reflected in the first virtual space;

an impulse response generator that generates an impulse response for the sound source object based on a shape of the second virtual space; and a generator that generates, based on the impulse response and the predetermined sound, a sound signal to be outputted.

10. The information processing method according to claim 1, wherein the second virtual space is smaller than the first virtual space.

11. The information processing method according to claim 1, wherein the second virtual space is generated by converting the obstacle in the first virtual space to be placed on the virtual reflection surface.

* * * * *